J. E. GIBBS.
Churn-Dasher.
No. 219,934. Patented Sept. 23, 1879.
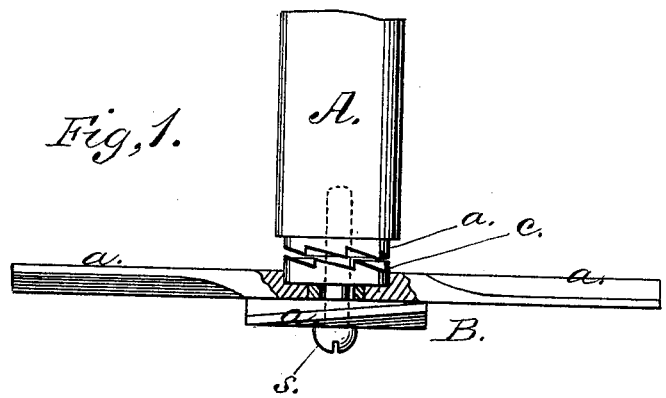
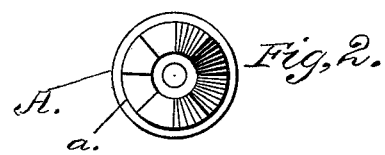
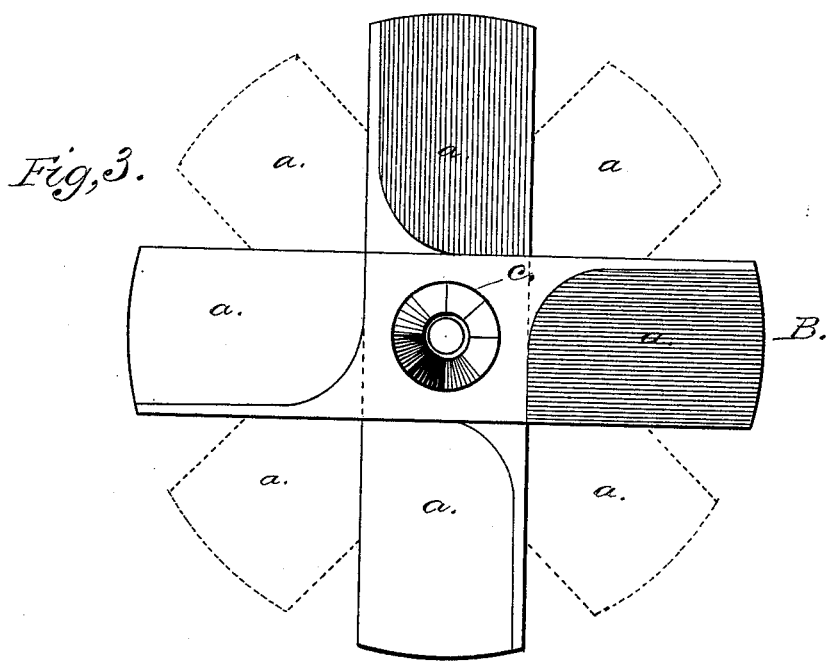
WITNESSES
Villette Anderson
F. J. Masi
INVENTOR
James E. Gibbs
by E. W. Anderson
his ATTORNEY

UNITED STATES PATENT OFFICE.

JAMES E. GIBBS, OF SCOTTSBOROUGH, ALABAMA, ASSIGNOR OF ONE-HALF HIS RIGHT TO CHARLES S. FREEMAN AND ROBT. H. BYNUM, OF SAME PLACE.

IMPROVEMENT IN CHURN-DASHERS.

Specification forming part of Letters Patent No. 219,934, dated September 23, 1879; application filed July 26, 1879.

*To all whom it may concern:*

Be it known that I, JAMES E. GIBBS, of Scottsborough, in the county of Jackson and State of Alabama, have invented a new and valuable Improvement in Churn-Dashers; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side view of my improved churn-dasher and staff. Fig. 2 is a bottom view of the staff, and Fig. 3 is a top view of the dasher.

This invention has relation to an improvement in rotary churn-dashers; and the nature of the invention consists in combining with the staff and a dasher rotating on its end a ratchet-clutch upon the end of said staff, and a similar clutch upon the contiguous face of the dasher, whereby, as the rod is thrust down, the dasher rises and is locked to the shaft, and when the said rod is drawn up the dasher descends and is disengaged from the staff end, thus greatly facilitating stroke, as will be hereinafter more fully set forth.

In the annexed drawings, the letter A designates the dasher-staff, constructed of wood, and having on its lower end the metallic ratchet-clutch $a$, the teeth of which all bite in the same direction and radiate from the center of said clutch. B designates the dasher, composed of any desired number of oblique blades, $a'$, and provided at its hub, or at the intersection of said blades, with a recessed ratchet-clutch, $c$, corresponding to the clutch $a$ of the staff, and adapted to interlock therewith. The dasher has extending through it centrally a metallic sleeve, that serves as a bearing for the spindle $s$, upon which the dasher revolves. This spindle is usually screwed into the staff, and is provided with a head, that acts as a stop to hold the dasher on the said staff. This dasher has a certain degree of play upon the spindle.

When the dasher is forced down into the cream it is raised by the pressure of the cream against the dash-rod, and the clutches $a\ c$ become engaged, thus fixing the dasher and rod together, and causing the former to act with great force upon the butter-cells, at the same time causing the cream to swirl rapidly around in the cream-vessel. When the staff is drawn up the dasher falls away from the staff and the clutches are disconnected, so that the said dasher revolves freely on the spindle, and, while agitating the cream effectively, considerably lessens the labor occasioned in making the up-stroke.

What I claim as new, and desire to secure by Letters Patent, is—

In a churn, the combination, with a dash-rod, A, and a dasher, B, having oblique blades, and rotating on the end thereof, of a ratchet-clutch, $a$, on the end of said rod, and a similar ratchet-clutch, $c$, on the contiguous face of the dasher, adapted to engage each other on the downstroke and to be unlocked during the up-stroke, substantially as specified.

In testimony that I claim the above I have hereunto subscribed my name in the presence of two witnesses.

JAMES EDWIN GIBBS.

Witnesses:
CHARLES S. FREEMAN,
ROBT. H. BYNUM.